United States Patent [19]
Blohm et al.

[11] 3,873,520
[45] Mar. 25, 1975

[54] 9-FLUORENYL LACTAMIMIDES
[75] Inventors: Thomas R. Blohm, Norbert L. Wiech, Edward M. Roberts, all of Cincinnati, Ohio
[73] Assignee: Richardson-Merrell Inc., Wilton, Conn.
[22] Filed: Aug. 9, 1973
[21] Appl. No.: 386,996

Related U.S. Application Data
[63] Continuation-in-part of Ser. No. 143,257, May 13, 1971, abandoned.

[52] U.S. Cl... 260/239 B, 260/239 BE, 260/293.62, 260/296 T, 260/326.5 C, 260/326.85, 260/326.9, 424/244, 424/263, 424/267, 424/274
[51] Int. Cl.. C07d 27/04, C07d 29/28, C07d 41/04
[58] Field of Search..... 260/239 B, 239 BE, 293.62, 260/296 T, 326.5 C, 326.9, 326.85

[56] References Cited
FOREIGN PATENTS OR APPLICATIONS
2,119,163  11/1971  Germany......................... 260/239 B Primary Examiner—Alton D. Rollins
Attorney, Agent, or Firm—George W. Rauchfuss, Jr.; Eugene O. Retter

[57] ABSTRACT
Compounds possessing hypoglycemic, diuretic and platelet aggregation inhibition activities of the following formula:

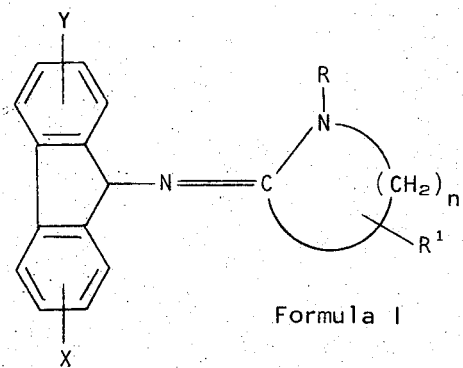

Formula I wherein $n$ is an integer of 3 to 11, R is hydrogen or lower alkyl of from 1 to 4 carbon atoms, $R^1$ is hydrogen, halogen, lower alkyl of from 1 to 4 carbon atoms and X and Y are selected from hydrogen, halogen, lower alkyl of from 1 to 4 carbon atoms, lower alkoxy of from 1 to 4 carbon atoms, or nitro and may be the same or different; and the pharmaceutically acceptable acid addition salts thereof.

6 Claims, No Drawings

9-FLUORENYL LACTAMIMIDES

This is a continuation-in-part of application Ser. No. 143,257, filed May 13, 1971, and now abandoned.

FIELD OF INVENTION

This invention relates to novel substituted 9-fluorenyl lactamimide compounds and more particularly to said novel compounds having diuretic utility and additionally hypoglycemic and platelet aggregation inhibition activity.

SUMMARY OF INVENTION

The novel compounds of this invention are represented by those having the following Formula I:

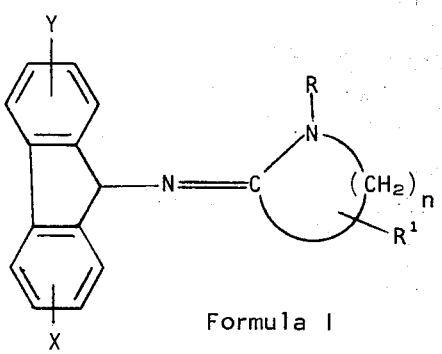

Formula I wherein $n$ is an integer of 3 to 11, R is hydrogen or lower alkyl of from 1 to 4 carbon atoms, $R^1$ is hydrogen, halogen, lower alkyl of from 1 to 4 carbon atoms, and X and Y are selected from hydrogen, halogen, lower alkyl of from 1 to 4 carbon atoms, lower alkoxy of from 1 to 4 carbon atoms, or nitro and may be the same or different. Also included within the scope of the invention are the pharmaceutically acceptable acid addition salts of these compounds and the individual optical isomers of the compounds of this invention where applicable.

DETAILED DESCRIPTION OF INVENTION

For convenience and uniformity we have represented and named all compounds described in the disclosure as substituted 2-iminoperhydroazacarbocyclics, as represented by Formula I. It is known, however, that compounds of this type as acid addition salts may also be represented by the tautomeric form illustrated by the following Formula II:

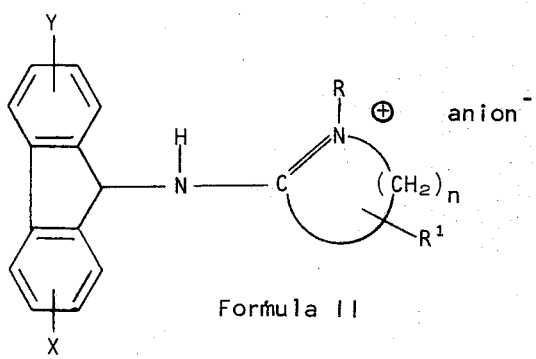

Formula II

This tautomerism has been discussed by R. Kwok and P. Pranc, J. Org. Chem. 32, 740 (1967). Structures of this formula could be named differently. In solution under the conditions of the therapeutic utility, the proportion of each tautomeric form, or the delocalization of the charge between the two nitrogen atoms, will be dependent upon numerous factors including the nature of the substituents, the pH of the medium, and the like. This equilibrium state is conveniently depicted by the following Formula III:

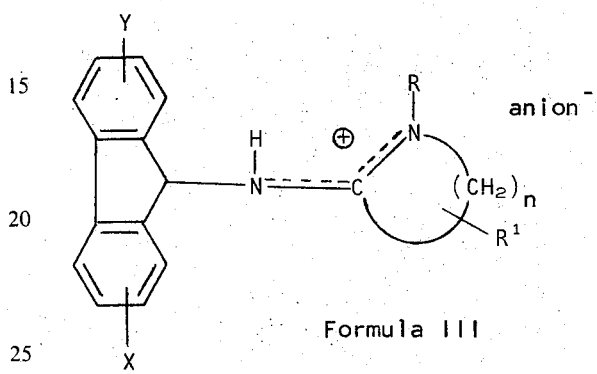

Formula III

It is understood that this disclosure relates to compounds represented or named in either tautomeric form.

Preferred compounds of this invention are of the following Formula IV:

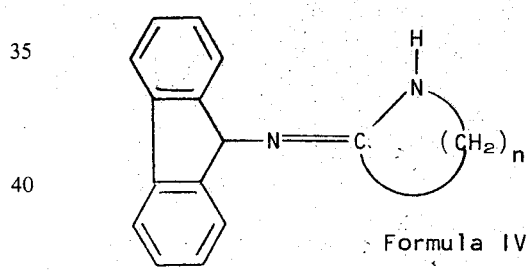

Formula IV wherein $n$ is an integer of from 4 to 7.

Each of the symbols R in the compounds of Formulae I, II and III is either hydrogen or lower alkyl of from 1 to 4 carbon atoms such as methyl, ethyl, propyl or butyl. Each $R^1$ symbol in the compounds of the Formulae I, II and III is hydrogen, halogen such as chlorine, fluorine, bromine or iodine, or lower alkyl of from 1 to 4 carbon atoms such as methyl, ethyl, propyl or butyl. The symbols X and Y in the compounds of the Formulae I, II and III may be the same or different and are selected from hydrogen, nitro, halogen such as fluorine, chlorine, bromine or iodine, lower alkyl such as methyl, ethyl, propyl or butyl, lower alkoxy such as methoxy, ethoxy, propoxy or butoxy.

As examples of compounds of this invention there may be mentioned, for example:
5-tert-butyl-2-(9-fluorenylimino)hexahydroazepine,
2-(9-fluorenylimino)azacyclotridecane,
2-(9-fluorenylimino)pyrrolidine,
2-(2-nitro-9-fluorenylimino)piperidine,
hexahydro-2-(3-methoxy-9-fluorenylimino)azepine, and
3-chloro-2-(9-fluorenylimino)hexahydroazepine.

As examples of preferred compounds there may be mentioned. for example,
2-(9-fluorenylimino)hexahydroazepine,
2-(9-fluorenylimino)octahydroazocine, and
2-(9-fluorenylimino)piperidine.

Pharmaceutically acceptable acid addition salts of the base compounds of this invention are those of any suitable inorganic or organic acid. Suitable inorganic acids are, for example, hydrochloric, hydrobromic, sulfuric, or phosphoric acids and the like. Suitable organic acids are, for example, carboxylic acids such as acetic, propionic, glycolic, lactic, pyruvic, malonic, succinic, fumaric, malic, tartaric, citric, ascorbic, maleic, hydroxy maleic, benzoic, hydroxybenzoic, phenylacetic, cinnamic, salicylic, 2-phenoxybenzoic and the like, or sulfonic acids such as methane sulfonic, 2-hydroxyethane sulfonic acid and the like.

The compounds of this invention including acid addition salts and individual optical isomers where applicable have diuretic utility. In addition to their diuretic utility these compounds also possess hypoglycemic and platelet aggregation inhibition activity. These compounds can be used in the form of pharmaceutical preparations which contain the novel compounds suitable for oral or parenteral administration. The quantity of compound in the unit dosage can vary over a wide range to provide from about 1.0 mg/kg to about 100 mg/kg of body weight of the patient per dose to achieve the desired effect. The desired diuretic effect can be obtained, for example, in a 70 kg subject by administration of 25 to 500 mg of the active ingredient taken 1 to 4 times daily.

The utility of the compounds of this invention is illustrated by the following. The compound of Example 3 demonstrated in vitro a 93 percent inhibition of adenosine diphosphate induced platelet aggregation in human platelet rich plasma when 100 μg of compound was added to each milliliter of plasma. When 25 mg/kg of body weight of the compound of Example 1 was orally administered to rats the percent of urine excretion measured in milliliters was increased by 237 percent in 5 hours over that of a control group. Similarly when 25 mg/kg of body weight of the same compound was orally administered to dogs the percent urine excretion was increased 224.9 percent over control. When the compound of Example 5 was administered to rats at 100 mg/kg of body weight the plasma glucose was reduced to 66 percent of control.

The compounds of this invention may be prepared by reacting an excess of a lactim ether of the formula:

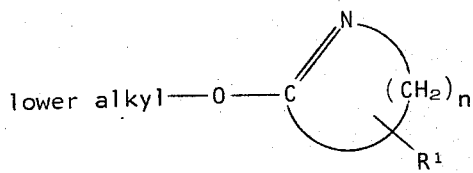

Formula V with a primary amine of the following formula:

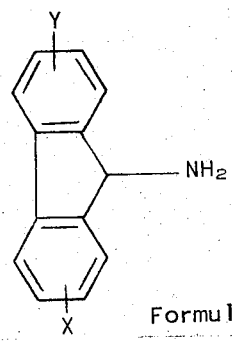

Formula VI as reported by R. E. Benson and T. L. Cairns, J. Am. Chem. Soc. 70, 2115-8 (1948). The various symbols, that is, $n$, $R^1$, Y and X have the meanings defined hereinabove and lower alkyl may be methyl, ethyl or the like. The reaction may be carried out with or without a solvent. When a solvent is used, that preferred is a lower alcohol such as methanol, ethanol and the like; however, other solvents such as benzene, toluene and the like are suitable. A basic or acidic catalyst such as a tertiary amine or hydrogen chloride may be added to the reaction mixture. In general it is preferred that the hydrochloride salt of the amine be used in the reaction. The temperature of the reaction varies from −40°C. to 180°C., and the preferred temperature is about 15°–25°C. The reaction time varies from 1 hour to about 60 days, being dependent upon the temperature of the reaction, the reactant primary amine, and more particularly on the degree of stearic hindrance of the amine since highly stearically hindered amines react very slowly.

The lactim ethers which find use in this reaction may be prepared from commercially available corresponding lactams by methods known in the art. For example, by reaction of an appropriate lactam with dimethyl sulfate in a solvent such as benzene, toluene, xylene or the like at the reflux temperature of the solvent for 2 to 24 hours the corresponding O-methyllactim ether is obtained.

Similarly the above reaction may be carried out by using known thiolactim ethers such as S-methylthiocaprolactim [H. Behringer and H. Meier, Ann. 607, 73–91 (1957)], or by using thiolactams wherein the latter case it may be advantageous to employ a catalyst such as mercury or silver oxide or cyanide [J. Gauthier and J. Renault, C.R. Acad. Sci. 234, 2081 (1952)].

The fluoren-9-amines which find use in this invention may be prepared from the corresponding fluoren-9-one oximes by reduction. Preparation of the oximes is well known in the art, for example, see H. L. Parr and T. Lloyd, Chem. Ind. (London) 1969, 240. A number of methods of reduction may be used, such as zinc dust in acetic acid. Catalytic hydrogenation using platinum, rhodium-on-charcoal or palladium-on-charcoal in neutral, acidic, that is, acetic acid, or alkaline medium, that is, 20 percent methanolic ammonia, may be used. Also, lithium aluminum hydride in ethyl ether or tetrahydrofuran may also be used as well as several other reduction methods.

The compounds of this invention may also be prepared using a complex of an appropriate lactam with phosphorus oxychloride, phosgene, borontrifluoride etherate, dimethyl sulfate, hydrogen halide or a combination of two or more such reagents. Several attempts have been made to formulate the structure of these complexes, and one formulation includes the vinyl halide, that is, 2-chloro-4,5,6,7-tetrahydro-3H-azepine. However, none of the formulations have been unambiguously established. This reaction has been studied by H. Bredereck in a series of articles in Chem. Ber., 1953–1968, particularly in vol. 94, 2278 (1961) and vol. 97, 1403 (1964). The complex formed is reacted with an appropriate primary amine described hereinabove in an aromatic hydrocarbon solvent such as benzene, toluene or xylene or an alkyl polyhalide solvent such as carbon tetrachloride, chloroform, methylene chloride, dichlorethane, tetrachloroethylene or the like. The reaction temperature is limited by the boiling point of the solvent, however, in some cases it is advantageous to carry out the reaction at room temperature or with cooling at 0° to −40°C. depending on the reactants.

Also by catalytic hydrogenation of an appropriate aminopyridine derivative as described by T. Grave, J. Am. Chem. Soc. 46, 1460 (1924), M. Freifelder et al., J. Org. Chem. 29, 3730 (1964) and L. Birkhofer, Ber. 75, 429 (1942), compounds of this invention containing a piperidine moiety may be obtained.

EXAMPLES

Representative compounds of the invention and their preparation are illustrated in the following specific examples.

EXAMPLE 1

2-(9-Fluorenylimino)hexahydroazepine hydrochloride

A mixture of 58.5 g (0.27 mole) of 9-aminofluorene hydrochloride, 40 g (0.31 mole) of o-methylcaprolactim and 900 ml of methanol was refluxed for 1 hour. After completion of the reflux period about one-half of the solvent was removed under vacuum. The solution was cooled to room temperature and the product was collected. The filtrate was concentrated to one-half volume and cooled to obtain a second crop. The two crops were combined and recrystallized twice from methanolacetone (1:1) and from ethanol, respectively, and 66.5 g (79 percent yield) of the title compound was obtained, M.P. 307°–308°C. The identity of the compound was confirmed by microanalysis, infrared and ultraviolet spectra.

EXAMPLE 2

2-(9-Fluorenylimino)piperidine hydrochloride

An excess of o-methylvalerolactim (15 ml) was added to 15.0 g of powdered fluoren-9-amine hydrochloride and the mixture was stirred into a slurry without addition of a solvent. After 3 days standing at room temperature the mixture had completely solidified. The solid was collected and washed with a small amount of ethanol, 15.6 g. Several recrystallizations from methanol-acetone gave the pure title compound, M.P. 272°–275°C. (dec.); microanalysis and spectra confirmed the structure.

EXAMPLE 3

5-tert-Butyl-2-(9-florenylimino)hexahydroazepine hydrochloride

To 18.6 g (0.11 mole) of 5-tert-butylcaprolactam in 200 ml of dry benzene is added dropwise over 10 minutes 15.4 g (0.10 mole) of phosphorus oxychloride. The mixture is stirred at room temperature for 4 hours, after which 18.1 g (0.10 mole) of 9-aminofluorene is added and the reaction mixture is stirred at room temperature for 1 hour, then refluxed for 3 hours and allowed to stand overnight. The resulting precipitate was collected, and the filtrate washed with 2N HCl. The wash was made basic with 2N NaOH and combined with the precipitate which was then extracted into chloroform, washed, dried and the solvent evaporated. To the resulting oil is added one equivalent of methanolic HCl and the salt which crystallizes after the addition of acetone is recrystallized from methanol-acetone, M.P. 296°–299°C. (dec.). The structure of the title compound is confirmed by elemental analysis, infrared and ultraviolet spectra.

EXAMPLE 4

2-(9-Fluorenylimino)azacyclotridecane hydrochloride

Following the procedure described in Example 3 but substituting 0.10 mole of 2-azacyclotridecanone for 5-tert-butylcaprolactam the title compound is obtained.

EXAMPLE 5

2-(9-Fluorenylimino)octahydroazocine hydrochloride

Following the procedure described in Example 2, but substituting o-methylenantholactim for o-methylvalerolactim, the title compound was obtained, M.P. 287°–289°C. (dec.).

EXAMPLE 6

2-(9-Fluorenylimino)octahydroazonine hydrochloride

Following the procedure described in Example 2, but substituting o-methylcaprylolactim for o-methylvalerolactim, the title compound is obtained.

EXAMPLE 7

2-(9-Fluorenylimino)pyrrolidine hydrochloride

Following the procedure described in Example 2, but substituting o-methylbutyrolactim for o-methylvalerolactim, the title compound was prepared, M.P. 267.5°–269.5°C. (dec.).

EXAMPLE 8

2-(9-Fluorenylimino)-N-methylpiperidine hydrochloride

Following the procedure described in Example 3, but substituting an equivalent molar quantity of N-methyl-2-piperidinone for 5-tert-butylcaprolactam. the title compound is obtained.

EXAMPLE 9

2-(2-Nitro-9-fluorenylimino)piperidine hydrochloride

Following the procedure described in Example 2, but substituting 2-nitrofluoren-9-amine hydrochloride [H. L. Parr and T. L. Fletcher, J. Org. Chem. 26. 2244 (1961)] for fluoren-9-amine hydrochloride, the title compound is obtained.

EXAMPLE 10

Hexahydro-2-(3-methoxy-9-fluorenylimino)azepine hydrochloride

When 3-methoxyfluoren-9-amine, described by F. Ullmann and H. Bleier, Ber 35, 4273 (1902) and W. J. P. Neish, Rec. Trav. Chim. Pays-Bas 69, 207 (1950) is substituted for fluoren-9-amine in the procedure described in Example 1 the title compound is prepared.

EXAMPLE 11

3-chloro-2-(9-fluorenylimino)hexahydroazepine hydrochloride

Following the procedure described in Example 3 but substituting α-chlorocaprolactam for 5-tert-butylcaprolactam, the title compound is obtained.

EXAMPLE 12

Fluoren-9-amine hydrochloride

Fluoren-9-one oxime (120 g) in 801 ml of refluxing acetic acid and 39 ml of water was reduced by portionwise addition of 210 g of zinc dust. Refluxing was continued for 1 hour after which 1.2 liter of water was added. The mixture was filtered and the filtrate was acidified with concentrated hydrochloric acid then cooled. The resulting product was converted to the free base with dilute ammonia and recrystallized from hexane. The free base was then treated with ethereal hydrogen chloride to give the desired product, M.P. 228°–235°C.

EXAMPLE 13

2-(1-Chloro-9-fluorenylimino)hexahydroazepine hydrochloride

Following the procedure described in Example 12, 1-chloro-fluoren-9-amine hydrochloride may be prepared from 1-chloro-fluoren-9-one oxime that has been described by H. L. Parr and T. Lloyd, Chem. Ind. (London) 1969, 240. Following the procedure in Example 1 but substituting 1-chloro-fluoren-9-amine hydrochloride for fluoren-9-amine hydrochloride the title compound is obtained.

EXAMPLE 14

2-(2,7-Dichloro-9-fluorenylimino)hexahydroazepine hydrochloride

Following the procedure described in Example 12, 2,7-dichlorofluoren-9-amine hydrochloride is prepared from 2,7-dichloro-fluoren-9-one oxime that has been described by H. L. Parr and T. Lloyd, Chem. Ind. (London), 1969, 240. Similarly the 1,6-, 1,8- and 3,6-dichlorofluoren-9-one oximes, described by E. H. Huntress and I. S. Cliff, J. Am. Chem. Soc. 55, 2559 (1933) and A. Barker and C. C. Barker, J. Chem. Soc., 1954, 870, respectively, may be reduced to the isomeric dichloro-fluoren-9-amines. Following the procedure described in Example 1 but substituting 2,7-dichlorofluoren-9-amine hydrochloride for fluoren-9-amine hydrochloride, the title compound is prepared. Similarly the isomeric dichloro derivatives are obtained.

EXAMPLE 15

Hexahydro-2-(3-methyl-9-fluorenylimino)azepine hydrochloride

Following the procedure described in Example 12, 3-methylfluoren-9-one oxime, described by B. M. Benjamin and C. J. Collins, J. Am. Chem. Soc. 75, 402 (1953) is reduced to the amine. Similarly, 4-methylfluoren-9-one oxime, described by B. R. T. Keene and P. Tissington, J. Chem. Soc. 1965, 3032, and 1-methylfluoren-9-one oxime, described by T. P. C. Mulholland and G. Ward, J. Chem. Soc., 1954, 4676, is reduced to the isomeric methylfluoren-9-amines. Following the procedure described in Example 1, but substituting 3-methylfluoren-9-amine hydrochloride the title compound is prepared. The 4- and 1-methyl substituted isomers are prepared analogously.

EXAMPLE 16

2-(1,7-Dimethylfluoren-9-ylimino)hexahydroazepine hydrochloride

Gibberenone oxime, that is, 1,7-dimethylfluoren-9-one oxime, described by T. P. C. Mulholland and G. Ward, J. Chem. Soc. 1954, 4676, may be reduced to 1,7-dimethylfluoren-9-amine by the procedure described in Example 12 as by other known procedures. Similarly, 4,5-dimethylfluoren-9-one oxime, described by B. R. T. Keene and P. Tissington, J. Chem. Soc. 1965, 3032, may be reduced to the isomeric amine. Following the procedure described in Example 1, but substituting 1,7-dimethylfluoren-9-amine hydrochloride for fluoren-9-amine hydrochloride, the title compound is prepared.

We claim:

1. A compound selected from
   A. A compound of the formula

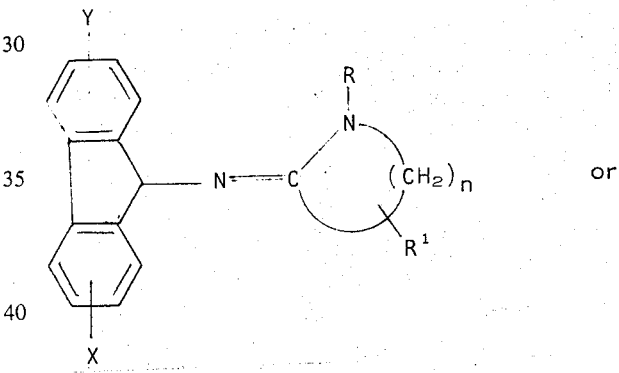

or

B. a pharmaceutically acceptable acid addition salt thereof, wherein $n$ is an integer of 3 to 11, R is selected from hydrogen or lower alkyl of from 1 to 4 carbon atoms, $R^1$ is selected from hydrogen, halogen or lower alkyl of from 1 to 4 carbon atoms and X and Y which may be the same or different are each individually selected from hydrogen, halogen, lower alkyl of from 1 to 4 carbon atoms, lower alkoxy of from 1 to 4 carbon atoms, or nitro.

2. A compound of claim 1 wherein R is hydrogen.

3. A compound of claim 2 wherein $R^1$ is hydrogen, $n$ is an integer of from 4 to 7 and both X and Y are each hydrogen.

4. A compound of claim 1 which is 2-(9-fluorenylimino) hexahydroazepine or a pharmaceutically acceptable acid addition salt thereof.

5. A compound of claim 1 which is 2-(9-fluorenylimino) octahydroazocine or a pharmaceutically acceptable acid addition salt thereof.

6. A compound of claim 1 which is 2-(9-fluorenylimino) piperidine or a pharmaceutically acceptable acid addition salt thereof.

* * * * *